(12) United States Patent
Thyagarajan et al.

(10) Patent No.: US 8,189,860 B2
(45) Date of Patent: May 29, 2012

(54) SYSTEMS AND METHODS OF USING SPATIAL/SPECTRAL/TEMPORAL IMAGING FOR HIDDEN OR BURIED EXPLOSIVE DETECTION

(75) Inventors: Kadayam S. Thyagarajan, San Diego, CA (US); Richard Patterson, San Diego, CA (US)

(73) Assignee: Micro USA, Inc., Poway, CA (US)

( * ) Notice: Subject to any disclaimer, the term of this patent is extended or adjusted under 35 U.S.C. 154(b) by 432 days.

(21) Appl. No.: 12/613,430

(22) Filed: Nov. 5, 2009

(65) Prior Publication Data

US 2010/0166330 A1 Jul. 1, 2010

Related U.S. Application Data

(60) Provisional application No. 61/112,245, filed on Nov. 7, 2008.

(51) Int. Cl.
*G06K 9/00* (2006.01)
*G01J 5/02* (2006.01)

(52) U.S. Cl. .................. 382/100; 382/291; 250/342

(58) Field of Classification Search .................. 382/100, 382/103, 106–108, 132, 154, 155, 162, 168, 382/173, 181, 191, 199, 203, 209, 216–220, 382/232, 250, 254, 274, 276–277, 285–291, 382/305, 312; 356/73; 250/341.1, 367, 342; 324/637

See application file for complete search history.

(56) References Cited

U.S. PATENT DOCUMENTS

| | | | | |
|---|---|---|---|---|
| 6,026,135 | A * | 2/2000 | McFee et al. | 376/159 |
| 6,777,684 | B1 * | 8/2004 | Volkov et al. | 250/341.1 |
| 7,417,440 | B2 * | 8/2008 | Peschmann et al. | 324/637 |
| 7,645,992 | B2 * | 1/2010 | Lyubchik et al. | 250/342 |
| 7,692,775 | B2 * | 4/2010 | Treado et al. | 356/73 |
| 8,030,617 | B2 * | 10/2011 | Enghardt et al. | 250/367 |
| 8,054,454 | B2 * | 11/2011 | Treado et al. | 356/73 |

* cited by examiner

*Primary Examiner* — Seyed Azarian
(74) *Attorney, Agent, or Firm* — David B. Waller (57) ABSTRACT

A method and system for increasing the detection, location, identification or classification of objects hidden on the surface or buried below the surface of the ground is disclosed. The method acquires image data in separate IR and/or visible spectral regions simultaneously and converts the data into intensity value arrays for each spectral region. These intensity value arrays are transformed into two-dimensional discrete wavelet transform arrays for each spectral region. The background clutter from the two-dimensional discrete wavelet transform arrays is removed; forming clutter reduced two-dimensional discrete wavelet transform arrays. The inverse two-dimensional discrete wavelet transform is performed on the clutter reduced two-dimensional discrete wavelet transform arrays to form clutter removed intensity value arrays. These arrays are subtracted in a pair-wise mariner to obtain chemical-specific spectral signatures. The processed images are correlated with 3-dimensional matched filters of known emissive signatures of objects to detect the presence of the object.

2 Claims, 3 Drawing Sheets

Figure 1

Figure 2

SYSTEMS AND METHODS OF USING SPATIAL/SPECTRAL/TEMPORAL IMAGING FOR HIDDEN OR BURIED EXPLOSIVE DETECTION

CROSS-REFERENCE TO RELATED APPLICATIONS

This application claims the benefit of U.S. Provisional Patent Application No. 61/112,245 titled "Methods of Using Spatial/Spectral/Temporal Imaging for Hidden or Buried Explosive Detection," filed Nov. 6, 2008, the contents of which are hereby incorporated by reference in its entirety.

TECHNICAL FIELD

The present disclosure is in the field of electronic imaging. More particularly in the area of multispectral surveillance imaging systems for identifying explosives hidden on the surface of or buried under the ground.

BACKGROUND OF THE INVENTION

The detection and identification of explosives hidden on the surface or buried under the ground has a multitude of commercial applications. After Sep. 11, 2000 the United States proclaimed war on the terrorists responsible for the attack on the Twin Towers in New York City. This included those directly involved as well as those who actively aided in the attack. Military intelligence from a number of sources identified specific individuals including the then ruler of Iraq. In previous United Nations investigations of Iraq sanctions were instituted against the country and its ruler to force compliance with international nuclear weapons reduction treaties. When attempts failed the United States invaded Iraq. During the attack and during the Iraq occupation non-conventional weapons were used by the insurgence to retaliate against United States forces. These devices were called improvised explosive devices or "IED"s. Because of their non-conventional appearance they were difficult to identify and consequently caused a number of casualties. Currently a number of methods exist for the detection of IED's including (1) Ground Penetrating Radar, which does not meet performance targets established by the military, (2) Electrical Impedance Tomography, which requires physical contact with the ground and which cannot be used in very dry soil, (3) X-Ray Backscatter, which is physically large, consumes large power and which requires high X-ray power to operate, (4) Acoustic-Seismic device, which is not effective when surface vegetation is present, (5) Chemical Vapor detection system, which is not sensitive to very low chemical density, (6) Biological method where mammals like dogs do not perform well under fatigue, (7) Nuclear Quadrupole Resonance, which is effective only at high signal-to-noise ratios, (8) Prodders and Probes, which are risky due to the possibility of detonation, (9) Thermal Signature Detection using analytical models, which requires soil-specific parameters such as heat capacity, soil density and thermal conductivity and which requires intensive iterative computations that may be unstable. Most of these existing methods either make physical contact with the ground or are not reliable.

Consequently there is a need for a multispectral imaging system that can detect, identify, locate and classify explosives such as improvised explosive devices (IEDs) both hidden on the surface or buried below the surface of the ground that is more reliable than current methods, does not require substantial amounts of energy to operate and does not require physical contact with the soil.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the present disclosure, a method for detecting, identifying or classifying of objects hidden on the surface or buried below the surface of the ground is provided, comprising: acquiring image data in separate infrared (IR) and/or visible spectral regions simultaneously; converting the acquired image data into intensity value arrays for each spectral region; applying a transformation on the intensity value arrays to form two-dimensional discrete wavelet transform arrays for each spectral region; removing background clutter from the two-dimensional discrete wavelet transform arrays to form clutter reduced two-dimensional discrete wavelet transform arrays; performing an inverse two-dimensional discrete wavelet transform on the clutter reduced two-dimensional discrete wavelet transform arrays to form clutter removed intensity value arrays; subtracting the clutter removed intensity value arrays in a pair-wise manner to obtain chemical-specific spectral signatures; and correlating the chemical-specific spectral signatures with 3-dimensional matched filters of known emissive signatures of objects to detect a presence of the object.

In another aspect of the present disclosure, the above method is provided, further comprising: applying at least one of a 3- and 4-dimensional feature space to compare a thermal spectral signature of an inspected soil with a thermal spectral signature of surrounding soil, to determine a disturbed soil condition.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features may become apparent from the following detailed description when considered in conjunction with the drawings. As such, other aspects of the disclosure are found throughout the specification.

DETAILED DESCRIPTION OF THE INVENTION

The present disclosure provides methods for detecting explosive hidden above or buried under the ground, such as IEDs, exploiting the thermal emissivity of chemical explosives. Each chemical explosive has a distinct emissivity characteristic or signature over a particular spectral region. This spectral signature falls in the long wave infrared (LWIR) region. Spectral signatures of explosives also change with time. The present disclosure detects and classifies buried IEDs using this thermal detection. An infrared detector array captures the thermal emissivity of the soil and its constituents. In order to distinguish the chemical signature from background clutter, we use infrared detector array as it is more suited to the spectral range of interest. This disclosure is unique in that it utilizes spatial, temporal and two spectral bands—a total of four dimensions to detect as much information about the chemical and background signatures as possible to maximize the probability of detection and minimize false alarm rates.

Figure 1:
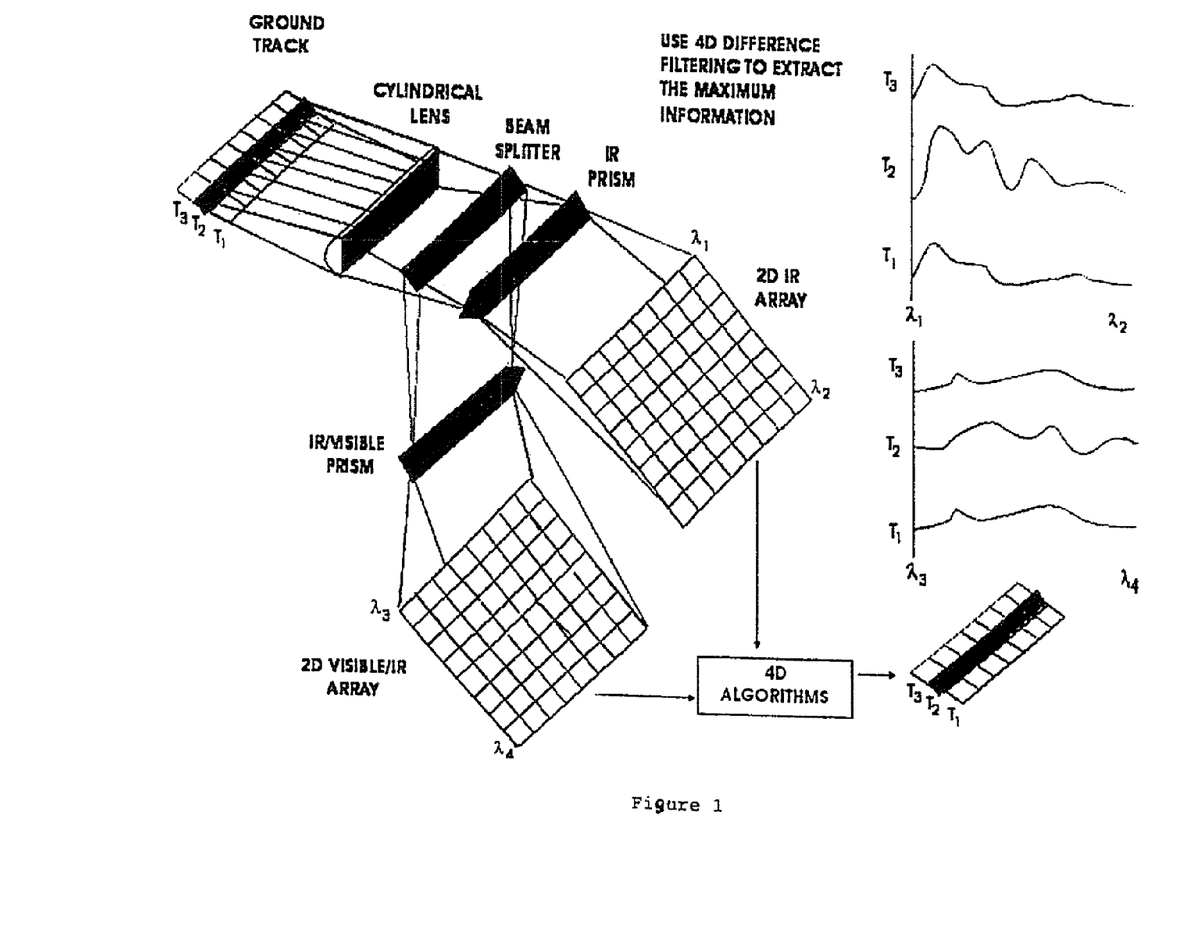
FIG. 1 is an illustration of capturing spatial/spectral/temporal signature of explosive chemical.

FIG. 1 depicts one embodiment of the present disclosure. The system captures the spectral signatures of the land surface area being imaged in two distinct bands of the electromagnetic spectrum. The land surface is scanned over a certain area at a fixed rate. The cylindrical lens focuses the scene on to the detector array of size M pixels by N rows. The focused thermal image is split by a beam splitter. Each beam then passes through a prism, which decomposes the corresponding thermal signal into its spectral components and the spectral components are captured by the detector array. Thus, each column of the detector array represents the emissive spectral signature of the land surface area that is being imaged on to a pixel. This process of capturing emissive signatures is carried out in time sequence thereby acquiring spatial-spectral-temporal information of the land surface area of interest.

Figure 2:
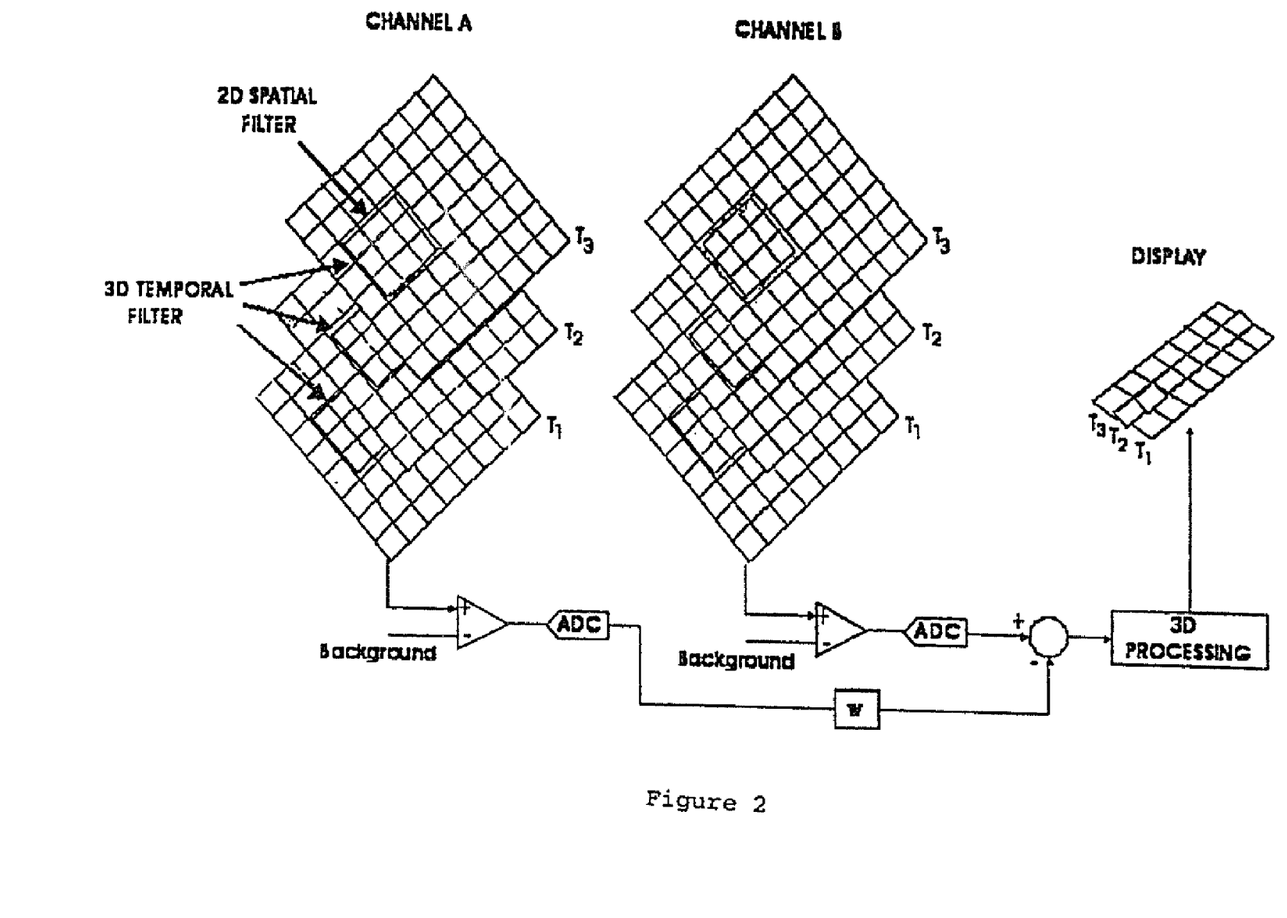
FIG. 2 is an illustration of image acquisition and processing.

FIG. 2 is a schematic diagram showing signal acquisition and processing. Each pixel value is subtracted from the background value and the difference signal is digitized by an analog-to-digital converter (ADC). This scheme of analog-to-digital conversion improves the accuracy of representing a pixel value in digital form with a fixed number of bits of representation. The same procedure is used for the pixels in the second spectral band, as shown. After the signal is acquired, the images from the two spatial-spectral-temporal dimensions are processed either by a special purpose signal processing hardware or by a computer (PC or mainframe). The processing consists of optimal weighted differencing whose purpose is to eliminate background clutter and extract chemical-specific spectral signatures. After signature extraction, detection and classification tasks are performed.

Detection is achieved by correlating the processed images with 3-dimensional matched filters. These matched filters are known a priori as they correspond to the emissive signatures of known chemical explosives. If the form of these filters are known analytically (for example if they are treated as Gaussian functions), then the filter parameters such as the mean and standard deviation are known or may be estimated from the acquired thermal images. The processed images are correlated with all the matched filters from a database and corresponding test statistics are computed. These test statistics are used in a maximum a posteriori (MAP) sense to test the hypotheses to decide whether an IED is present or not.

Figure 3:
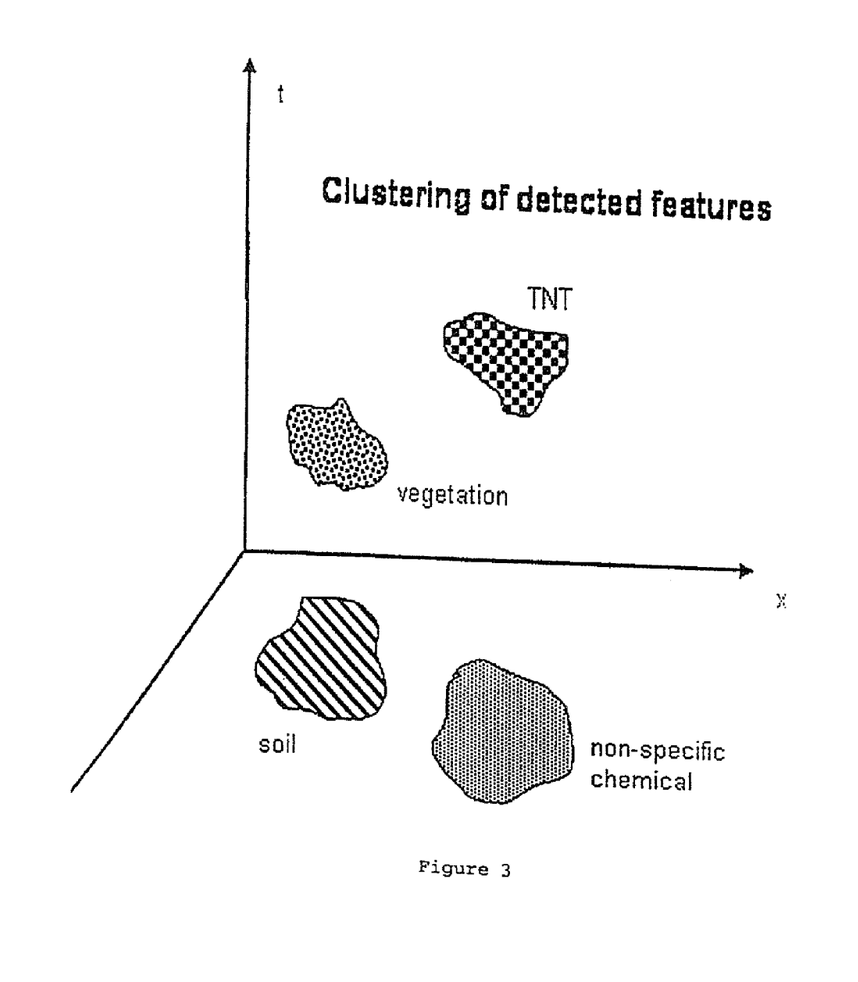
FIG. 3 is an illustration of clusters of soil constituents in a 3-dimensional feature space.

Classification of the detected chemical explosives is conducted using a suitable clustering procedure. In the 3- or 4-dimensional feature space, each soil constituent forms a cluster that is distinguished from the others, as shown in FIG. 3. In order to classify the detected chemical explosives, we compute the feature vectors of the emissive signatures and use the maximum likelihood (ML) method to identify the corresponding classes.

Our current disclosure exploits the following features of chemical explosives: (1) Disturbance of soil with respect to the surrounding—digging and placing explosive chemicals in the soil changes the appearance and is captured by both visible and infrared detectors. (2) Altered thermal signature—changes the thermal signature of soil by amounts exceeding 0.1° K. (3) Thermal emissive spectral signature—soil disturbance enhances spectral contrast. Because of these informative features used for detection and classification, the present disclosure is more robust and reliable as compared to the currently used methods. Moreover, the present disclosure can be mast-mounted on a vehicle or mounted on a helicopter and has little risk of detonation, covers a large area and can be carried out covertly. Additionally, the present disclosure uses (I) custom sensor in the visible spectrum to give a strong signal of the land surface, (II) focal plane arrays for the near IR spectrum at room temperature, (III) cantilever technology for the sensor in the LWIR spectrum. It should be pointed out that the infrared sensor using cantilever technology is readily available in the market and that it requires no cooling as opposed to other systems which require cooling by liquid nitrogen.

Camera

The multispectral surveillance system (MLSS) is a system for the detection of emissivity characteristics or signatures of explosives on or below the surface of the ground in the long wave infrared (LWIR) region through the elimination of most of the surface reflected thermal emission clutter components from multispectral images. The digitized outputs of the multispectral sensor are first captured and stored in the memory of a frame grabber card. Two of the three available spectral bands, X and Y, are selected for the processing that follows.

Sensors must exhibit a linear response to the input thermal emission; i.e., the output signal doubles for a doubling of the intensity of IR signal on the sensor. Deviation from this behavior is a non-linear response, which is measured for each pixel. A set of curve fitting coefficients is calculated for each pixel or class of pixels. These coefficients are then used to calculate the correction to be applied to each pixel during frame readout, and are stored in a ROM and table lookup.

The algorithms, operating system, and system control files are stored in an operational file folder that is downloaded to the appropriate units upon power turn on of the system. The algorithms and system control functions are then executed by the appropriate CPU, DSP, FPGA, or ASIC.

Use

The present disclosure is a processing method used for the detection of explosives hidden on the surface or buried in the ground using spectral images. These processing methods work with either two or three component images. In either case, the processing methods can be classified as optimal or suboptimal. Optimal processing methods use the statistics of the component images while the suboptimal ones use ad hoc parameters. FIG. 8 (former FIG. 1, patent app. 2) shows the classification of the various pre-detection processing methods described below. These processing methods could be performed purely in the spatial domain, frequency domain or the time and spatial domain.

In optimal processing, the camera sensors produce intensity images with differing intensity values in the three IR/visible spectral regions depending on the emissivity characteristics of the explosive, the presence of other infrared emitting sources such as fires or geothermal areas and reflections from the ground in the area being screened. The main idea behind explosive detection, therefore, is to subtract one component image from another so that the difference image retains only the explosive's signature. Preferably the signal from the surface reflection has been completely removed. It should be pointed out that the contrast due to the target between the component images is very small and depends on the emissivity of the explosives in the spectral regions. Thus, the process methods discriminate a very small contrast from image components. The ability to detect such a miniscule contrast depends on 1) the sensor dynamic range, 2) effectiveness of the preprocessing methods in eliminating background clutter, and 3) detection algorithm itself. Our processing methods address the third element primarily because the first is a limitation of the sensor and the second can be eliminated with standard methods known to those skilled in the art.

The processing methods of the present disclosure may be applied to two-channel and three-channel imaging. The processing methods for two-channel imaging may be used to minimize the mean square error, error variance, correlation and/or covariance. To minimize the mean square error a scaled image component is subtracted from another to enhance the low contrast of the explosive's signature. Consider the channels spanning three contiguous IR spectral bands. For the sake of argument, let us denote the three such contiguous channel pixels at location (m,n) by R(m,n), G(m,n) and B(m,n) and name them as red, green and blue respectively. Then, define the difference pixel $e_R(m,n)$ at the same pixel location as Equation 1

$$e_R(m,n) = R(m,n) - \alpha_R G(m,n)$$

We want to determine the scale factor $\alpha_R$, so as to minimize the mean square error $$\varepsilon_R = \frac{1}{MN} \sum_{m=0}^{M-1} \sum_{n=0}^{N-1} e_R^2(m, n).$$

The optimal coefficient $\alpha^*_R$ is obtained by setting the derivative of $\epsilon_R$ with respect to $\alpha_R$, to zero. This results in the optimal coefficient value as given by Equation 2

$$\alpha_R^* = \frac{\sum_{m=0}^{M-1} \sum_{n=0}^{N-1} R(m,n)G(m,n)}{\sum_{m=0}^{M-1} \sum_{n=0}^{N-1} G^2(m,n)}$$

Note that both the numerator and denominator have the same normalizing factor 1/MN and can, therefore, be omitted. The numerator of Equation 2 is a measure of the correlation between the two spectral bands R(m,n) and G(m,n) under consideration.

In a similar manner we can obtain the optimal scaling coefficients for the green-blue and blue-red channels and are given, respectively, by:

$$\alpha_G^* = \frac{\sum_{m=0}^{M-1} \sum_{n=0}^{N-1} G(m,n)B(m,n)}{\sum_{m=0}^{M-1} \sum_{n=0}^{N-1} B^2(m,n)},$$ Equation 3

$$\alpha_B^* = \frac{\sum_{m=0}^{M-1} \sum_{n=0}^{N-1} B(m,n)R(m,n)}{\sum_{m=0}^{M-1} \sum_{n=0}^{N-1} R^2(m,n)}$$

Minimization of the error variance $\epsilon_R$ instead of minimizing the mean square error, is given by:

$$\varepsilon_R = \frac{1}{MN} \sum_{m=0}^{M-1} \sum_{n=0}^{N-1} (e_R(m,n) - \mu_{cR})^2$$ Equation 4

$$= \frac{1}{MN} \sum_{m=0}^{M-1} \sum_{n=0}^{N-1} ((R(m,n) - \mu_R) - \alpha_R(G(m,n) - \mu_G))^2$$

where $\mu_R$ is given by:

$$\mu_{eR} = \frac{1}{MN} \sum_{m=0}^{M-1} \sum_{n=0}^{N-1} R(m,n) - \frac{\alpha_R}{MN} \sum_{m=0}^{M-1} \sum_{n=0}^{N-1} G(m,n)$$ Equation 5

This results in the optimal coefficient, which is expressed as:

$$\alpha_R^* = \frac{\sum_{m=0}^{M-1} \sum_{n=0}^{N-1} (R(m,n) - \mu_R)(G(m,n) - \mu_G)}{\sum_{m=0}^{M-1} \sum_{n=0}^{N-1} (G(m,n) - \mu_G)^2}$$ Equation 6

The numerator of

Equation 6 is a measure of the covariance rather than correlation and the denominator is the variance rather than sum of squares. Following the same argument for the red-green channel, we obtain the optimal coefficients for the green-blue and blue-red channels as:

$$\alpha_G^* = \frac{\sum_{m=0}^{M-1} \sum_{n=0}^{N-1} (G(m,n) - \mu_G)(B(m,n) - \mu_B)}{\sum_{m=0}^{M-1} \sum_{n=0}^{N-1} (B(m,n) - \mu_B)^2}$$ Equation 7

$$\alpha_B^* = \frac{\sum_{m=0}^{M-1} \sum_{n=0}^{N-1} (B(m,n) - \mu_B)(R(m,n) - \mu_R)}{\sum_{m=0}^{M-1} \sum_{n=0}^{N-1} (R(m,n) - \mu_R)^2}$$

While the above procedures determine the optimal coefficients by minimizing the mean square error or the error variance, there exists an alternative minimization criterion to compute the optimal weights. This is the minimum correlation between the difference channels. Consider the two error images corresponding to the red and green channels, as given by:

$$e_R(m,n) = R(m,n) - \alpha_{R1} G(m,n), \; e_G(m,n) = G(m,n) - \alpha_{G1} B(m,n)$$ Equation 8

Determination of the two coefficients, $\alpha_{R1}$, and $\alpha_{G1}$, by minimizing the cross correlation is expressed as:

$$\varepsilon_{RG} = \frac{1}{MN} \sum_{m=0}^{M-1} \sum_{n=0}^{N-1} e_R(m,n) e_G(m,n)$$ Equation 9

$$= \frac{1}{MN} \sum_{m=0}^{M-1} \sum_{n=0}^{N-1} (R(m,n) - \alpha_{R1} G(m,n))$$

$$(G(m,n) - \alpha_{G1} B(m,n))$$

Using the standard procedure for the minimization, the following normal equations are obtained:

$$\alpha_{G1}^* \sum_{m=0}^{M-1}\sum_{n=0}^{N-1} G(m,n)B(m,n) - \sum_{m=0}^{M-1}\sum_{n=0}^{N-1} G^2(m,n) = 0 \qquad \text{Equation 10}$$

$$\alpha_{R1}^* \sum_{m=0}^{M-1}\sum_{n=0}^{N-1} G(m,n)B(m,n) - \sum_{m=0}^{M-1}\sum_{n=0}^{N-1} B(m,n)R(m,n) = 0 \qquad \text{Equation 11}$$

$$\alpha_{B1}^* \sum_{m=0}^{M-1}\sum_{n=0}^{N-1} B(m,n)R(m,n) - \sum_{m=0}^{M-1}\sum_{n=0}^{N-1} B^2(m,n) = 0 \qquad \text{Equation 12}$$

$$\alpha_{G1}^* \sum_{m=0}^{M-1}\sum_{n=0}^{N-1} B(m,n)R(m,n) - \sum_{m=0}^{M-1}\sum_{n=0}^{N-1} R(m,n)G(m,n) = 0 \qquad \text{Equation 13}$$

$$\alpha_{R1}^* \sum_{m=0}^{M-1}\sum_{n=0}^{N-1} R(m,n)G(m,n) - \sum_{m=0}^{M-1}\sum_{n=0}^{N-1} R^2(m,n) = 0 \qquad \text{Equation 14}$$

$$\alpha_{B1}^* \sum_{m=0}^{M-1}\sum_{n=0}^{N-1} R(m,n)G(m,n) - \sum_{m=0}^{M-1}\sum_{n=0}^{N-1} G(m,n)B(m,n) = 0 \qquad \text{Equation 15}$$

Since
Equation 11 and
Equation 14 are distinct, as are the other equations, by adding them $\alpha^*_{R1}$, can be resolved by:

$$\alpha_{R1}^* = \frac{\sum_{m=0}^{M-1}\sum_{n=0}^{N-1} R^2(m,n) + \sum_{m=0}^{M-1}\sum_{n=0}^{N-1} B(m,n)R(m,n)}{\sum_{m=0}^{M-1}\sum_{n=0}^{N-1} R(m,n)G(m,n) + \sum_{m=0}^{M-1}\sum_{n=0}^{N-1} G(m,n)B(m,n)} \qquad \text{Equation 16}$$

In a like manner, the optimal coefficients for the green and blue channels are given by:

$$\alpha_{G1}^* = \frac{\sum_{m=0}^{M-1}\sum_{n=0}^{N-1} G^2(m,n) + \sum_{m=0}^{M-1}\sum_{n=0}^{N-1} R(m,n)G(m,n)}{\sum_{m=0}^{M-1}\sum_{n=0}^{N-1} G(m,n)B(m,n) + \sum_{m=0}^{M-1}\sum_{n=0}^{N-1} B(m,n)R(m,n)}, \qquad \text{Equation 17}$$

$$\alpha_{B1}^* = \frac{\sum_{m=0}^{M-1}\sum_{n=0}^{N-1} B^2(m,n) + \sum_{m=0}^{M-1}\sum_{n=0}^{N-1} G(m,n)B(m,n)}{\sum_{m=0}^{M-1}\sum_{n=0}^{N-1} B(m,n)R(m,n) + \sum_{m=0}^{M-1}\sum_{n=0}^{N-1} R(m,n)G(m,n)}, \qquad \text{Equation 18}$$

These are listed in Table 1.

By minimizing the covariance instead of the correlation between the channels, we obtain another set of optimal coefficients. These are identical in form to the coefficients in
Equation 11 and
Equation 14 except that each variable is replaced by its mean-removed value. These are listed in Table 1.

The processing methods for three-channel imaging may also be used to minimize the mean square error, error variance, correlation and/or covariance. In the three-channel imaging, all the three channels are considered to generate the difference image. Consequently, Equation 1 is rewritten as:

$$e_R(m,n) = R(m,n) - \alpha_R G(m,n) - \beta_R B(m,n) \qquad \text{Equation 19}$$

Similarly, the other two difference channels are given by:

$$e_G(m,n) = G(m,n) - \alpha_G B(m,n) - \beta_G R(m,n) \qquad \text{Equation 20}$$

$$e_B(m,n) = B(m,n) - \alpha_B R(m,n) - \beta_B G(m,n) \qquad \text{Equation 21}$$

Similar to the two-channel case, the minimization of the mean square error gives us the normal equations for the optimal coefficients:

$$\begin{bmatrix} \sum_{m=0}^{M-1}\sum_{n=0}^{N-1} G^2(m,n) & \sum_{m=0}^{M-1}\sum_{n=0}^{N-1} G(m,n)B(m,n) \\ \sum_{m=0}^{M-1}\sum_{n=0}^{N-1} G(m,n)B(m,n) & \sum_{m=0}^{M-1}\sum_{n=0}^{N-1} B^2(m,n) \end{bmatrix} \begin{bmatrix} \alpha_R^* \\ \alpha_R^* \end{bmatrix} = \begin{bmatrix} \sum_{m=0}^{M-1}\sum_{n=0}^{N-1} R(m,n)G(m,n) \\ \sum_{m=0}^{M-1}\sum_{n=0}^{N-1} B(m,n)R(m,n) \end{bmatrix} \qquad \text{Equation 22}$$

$$\begin{bmatrix} \sum_{m=0}^{M-1}\sum_{n=0}^{N-1} B^2(m,n) & \sum_{m=0}^{M-1}\sum_{n=0}^{N-1} B(m,n)R(m,n) \\ \sum_{m=0}^{M-1}\sum_{n=0}^{N-1} B(m,n)R(m,n) & \sum_{m=0}^{M-1}\sum_{n=0}^{N-1} R^2(m,n) \end{bmatrix} \begin{bmatrix} \alpha_G^* \\ \beta_G^* \end{bmatrix} = \begin{bmatrix} \sum_{m=0}^{M-1}\sum_{n=0}^{N-1} G(m,n)B(m,n) \\ \sum_{m=0}^{M-1}\sum_{n=0}^{N-1} R(m,n)G(m,n) \end{bmatrix} \qquad \text{Equation 23}$$

$$\begin{bmatrix} \sum_{m=0}^{M-1}\sum_{n=0}^{N-1} R^2(m,n) & \sum_{m=0}^{M-1}\sum_{n=0}^{N-1} R(m,n)G(m,n) \\ \sum_{m=0}^{M-1}\sum_{n=0}^{N-1} R(m,n)G(m,n) & \sum_{m=0}^{M-1}\sum_{n=0}^{N-1} G^2(m,n) \end{bmatrix} \begin{bmatrix} \alpha_B^* \\ \beta_B^* \end{bmatrix} = \begin{bmatrix} \sum_{m=0}^{M-1}\sum_{n=0}^{N-1} B(m,n)R(m,n) \\ \sum_{m=0}^{M-1}\sum_{n=0}^{N-1} G(m,n)B(m,n) \end{bmatrix} \qquad \text{Equation 24}$$

The optimal coefficients for the minimum error variance case will be identical to those in
Equation 22 through
Equation 24, for the three-channel case, except that each term must be replaced by its mean removed value. These are listed in Table 2.

The difference channels are as defined in
Equation 19 to
Equation 21. Minimization of the pair-wise correlations is as follows.

$$\varepsilon_R = \frac{1}{MN}\sum_{m=0}^{M-1}\sum_{n=0}^{N-1} e_R(m,n)e_G(m,n) \qquad \text{Equation 25}$$

$$\varepsilon_G = \frac{1}{MN} \sum_{m=0}^{M-1} \sum_{n=0}^{N-1} e_G(m,n) e_B(m,n)$$

$$\varepsilon_B = \frac{1}{MN} \sum_{m=0}^{M-1} \sum_{n=0}^{N-1} e_B(m,n) e_R(m,n)$$

By setting the derivatives of the three terms in Equation 25 with respect to the three coefficients the following equations are obtained:

$$\alpha_G \sum_{m=0}^{M-1} \sum_{n=0}^{N-1} G(m,n) B(m,n) + \beta_G \sum_{m=0}^{M-1} \sum_{n=0}^{N-1} R(m,n) G(m,n) = \sum_{m=0}^{M-1} \sum_{n=0}^{N-1} G^2(m,n) \quad \text{Equation 26}$$

$$\alpha_R \sum_{m=0}^{M-1} \sum_{n=0}^{N-1} G(m,n) B(m,n) + \beta_R \sum_{m=0}^{M-1} \sum_{n=0}^{N-1} B^2(m,n) = \sum_{m=0}^{M-1} \sum_{n=0}^{N-1} B(m,n) R(m,n) \quad \text{Equation 27}$$

$$\alpha_G \sum_{m=0}^{M-1} \sum_{n=0}^{N-1} B^2(m,n) + \beta_G \sum_{m=0}^{M-1} \sum_{n=0}^{N-1} B(m,n) R(m,n) = \sum_{m=0}^{M-1} \sum_{n=0}^{N-1} G(m,n) B(m,n) \quad \text{Equation 28}$$

$$\alpha_R \sum_{m=0}^{M-1} \sum_{n=0}^{N-1} R(m,n) G(m,n) + \beta_R \sum_{m=0}^{M-1} \sum_{n=0}^{N-1} B(m,n) R(m,n) = \sum_{m=0}^{M-1} \sum_{n=0}^{N-1} R^2(m,n) \quad \text{Equation 29}$$

$$\alpha_B \sum_{m=0}^{M-1} \sum_{n=0}^{N-1} B(m,n) R(m,n) + \beta_B \sum_{m=0}^{M-1} \sum_{n=0}^{N-1} G(m,n) B(m,n) = \sum_{m=0}^{M-1} \sum_{n=0}^{N-1} B^2(m,n) \quad \text{Equation 30}$$

$$\alpha_G \sum_{m=0}^{M-1} \sum_{n=0}^{N-1} B(m,n) R(m,n) + \beta_G \sum_{m=0}^{M-1} \sum_{n=0}^{N-1} R^2(m,n) = \sum_{m=0}^{M-1} \sum_{n=0}^{N-1} R(m,n) G(m,n) \quad \text{Equation 31}$$

$$\alpha_B \sum_{m=0}^{M-1} \sum_{n=0}^{N-1} R^2(m,n) + \beta_B \sum_{m=0}^{M-1} \sum_{n=0}^{N-1} R(m,n) G(m,n) = \sum_{m=0}^{M-1} \sum_{n=0}^{N-1} B(m,n) R(m,n) \quad \text{Equation 32}$$

$$\alpha_G \sum_{m=0}^{M-1} \sum_{n=0}^{N-1} G(m,n) B(m,n) + \beta_G \sum_{m=0}^{M-1} \sum_{n=0}^{N-1} R(m,n) G(m,n) = \sum_{m=0}^{M-1} \sum_{n=0}^{N-1} G^2(m,n) \quad \text{Equation 33}$$

$$\alpha_R \sum_{m=0}^{M-1} \sum_{n=0}^{N-1} R(m,n) G(m,n) + \beta_R \sum_{m=0}^{M-1} \sum_{n=0}^{N-1} B(m,n) R(m,n) = \sum_{m=0}^{M-1} \sum_{n=0}^{N-1} R^2(m,n) \quad \text{Equation 34}$$

$$\alpha_R \sum_{m=0}^{M-1} \sum_{n=0}^{N-1} R(m,n) G(m,n) + \beta_B \sum_{m=0}^{M-1} \sum_{n=0}^{N-1} G^2(m,n) = \sum_{m=0}^{M-1} \sum_{n=0}^{N-1} G(m,n) B(m,n) \quad \text{Equation 35}$$

$$\alpha_R \sum_{m=0}^{M-1} \sum_{n=0}^{N-1} G^2(m,n) + \beta_R \sum_{m=0}^{M-1} \sum_{n=0}^{N-1} G(m,n) B(m,n) = \sum_{m=0}^{M-1} \sum_{n=0}^{N-1} R(m,n) G(m,n) \quad \text{Equation 36}$$

$$\alpha_B \sum_{m=0}^{M-1} \sum_{n=0}^{N-1} B(m,n) R(m,n) + \beta_B \sum_{m=0}^{M-1} \sum_{n=0}^{N-1} G(m,n) B(m,n) = \sum_{m=0}^{M-1} \sum_{n=0}^{N-1} B^2(m,n) \quad \text{Equation 37}$$

Since equations (29) and (34) are identical we retain one of them, Equations (27) and (36) involve the same set of variables but are distinct. Therefore, we form a new equation by subtracting (27) from (36) to get:

$$\alpha_R \sum_{m=0}^{M-1} \sum_{n=0}^{N-1} [G^2(m,n) - G(m,n) B(m,n)] + \beta_R \sum_{m=0}^{M-1} \sum_{n=0}^{N-1} [G(m,n) B(m,n) - B^2(m,n)] = \sum_{m=0}^{M-1} \sum_{n=0}^{N-1} [R(m,n) G(m,n) - B(m,n) R(m,n)] \quad \text{Equation 38}$$

Now equations (29) and (38) can be consolidated as:

$$\begin{bmatrix} \sum_{m=0}^{M-1} \sum_{n=0}^{N-1} RG & \sum_{m=0}^{M-1} \sum_{n=0}^{N-1} BR \\ \sum_{m=0}^{M-1} \sum_{n=0}^{N-1} [G^2 - GB] & \sum_{m=0}^{M-1} \sum_{n=0}^{N-1} [GB - B^2] \end{bmatrix} \quad \text{Equation 39}$$

$$\begin{bmatrix} \alpha_R \\ \beta_R \end{bmatrix} = \begin{bmatrix} \sum_{m=0}^{M-1}\sum_{n=0}^{N-1} R^2 \\ \sum_{m=0}^{M-1}\sum_{n=0}^{N-1} [RG - BR] \end{bmatrix}$$

In Equation (39), the double subscripts are omitted for want of space. In a similar manner, we arrive at the rest of the equations:

$$\begin{bmatrix} \sum_{m=0}^{M-1}\sum_{n=0}^{N-1} GB & \sum_{m=0}^{M-1}\sum_{n=0}^{N-1} RG \\ \sum_{m=0}^{M-1}\sum_{n=0}^{N-1} [B^2 - BR] & \sum_{m=0}^{M-1}\sum_{n=0}^{N-1} [BR - R^2] \end{bmatrix} \begin{bmatrix} \alpha_G \\ \beta_G \end{bmatrix} = \begin{bmatrix} \sum_{m=0}^{M-1}\sum_{n=0}^{N-1} G^2 \\ \sum_{m=0}^{M-1}\sum_{n=0}^{N-1} [GB - RG] \end{bmatrix}$$

Equation 40

$$\begin{bmatrix} \sum_{m=0}^{M-1}\sum_{n=0}^{N-1} BR & \sum_{m=0}^{M-1}\sum_{n=0}^{N-1} GB \\ \sum_{m=0}^{M-1}\sum_{n=0}^{N-1} [R^2 - RG] & \sum_{m=0}^{M-1}\sum_{n=0}^{N-1} [RG - G^2] \end{bmatrix}$$

$$\begin{bmatrix} \alpha_B \\ \beta_B \end{bmatrix} = \begin{bmatrix} \sum_{m=0}^{M-1}\sum_{n=0}^{N-1} B^2 \\ \sum_{m=0}^{M-1}\sum_{n=0}^{N-1} [BR - GB] \end{bmatrix}$$

Equation 41

The optimal coefficients for the three-channel minimum correlation case are obtained by solving the normal equations (39) through (41).

For the minimum covariance case the optimal coefficients will be identical to those corresponding to the minimum correlation case, except that each entry in the Equation 39 through Equation 41 must be replaced by its mean-removed value. These are listed in Table 2.

TABLE 1

Optimal Coefficients: Two-channel case

| Case | Optimal Coefficients | Minimum MSE or Variance Value |
|---|---|---|
| Minimum MSE | $\alpha_R^* = \dfrac{\sum_{m=0}^{M-1}\sum_{n=0}^{N-1} R(m,n)G(m,n)}{\sum_{m=0}^{M-1}\sum_{n=0}^{N-1} G^2(m,n)}$ | $\sum_{m=0}^{M-1}\sum_{n=0}^{N-1} R^2(m,n) - \dfrac{\left\{\sum_{m=0}^{M-1}\sum_{n=0}^{N-1} R(m,n)G(m,n)\right\}^2}{\sum_{m=0}^{M-1}\sum_{n=0}^{N-1} G^2(m,n)}$ |
| | $\alpha_G^* = \dfrac{\sum_{m=0}^{M-1}\sum_{n=0}^{N-1} G(m,n)B(m,n)}{\sum_{m=0}^{M-1}\sum_{n=0}^{N-1} B^2(m,n)}$ | $\sum_{m=0}^{M-1}\sum_{n=0}^{N-1} G^2(m,n) - \dfrac{\left\{\sum_{m=0}^{M-1}\sum_{n=0}^{N-1} G(m,n)B(m,n)\right\}^2}{\sum_{m=0}^{M-1}\sum_{n=0}^{N-1} B^2(m,n)}$ |
| | $\alpha_B^* = \dfrac{\sum_{m=0}^{M-1}\sum_{n=0}^{N-1} B(m,n)R(m,n)}{\sum_{m=0}^{M-1}\sum_{n=0}^{N-1} R^2(m,n)}$ | $\sum_{m=0}^{M-1}\sum_{n=0}^{N-1} B^2(m,n) - \dfrac{\left\{\sum_{m=0}^{M-1}\sum_{n=0}^{N-1} B(m,n)R(m,n)\right\}^2}{\sum_{m=0}^{M-1}\sum_{n=0}^{N-1} R^2(m,n)}$ |
| Minimum Variance | $\alpha_R^* = \dfrac{\sum_{m=0}^{M-1}\sum_{n=0}^{N-1} \check{R}(m,n)\tilde{G}(m,n)}{\sum_{m=0}^{M-1}\sum_{n=0}^{N-1} \tilde{G}^2(m,n)}$ | $\sigma_R^2 - \dfrac{\left\{\sum_{m=0}^{M-1}\sum_{n=0}^{N-1} \check{R}(m,n)\tilde{G}(m,n)\right\}^2}{\sigma_G^2}$ |
| | $\alpha_G^* = \dfrac{\sum_{m=0}^{M-1}\sum_{n=0}^{N-1} \tilde{G}(m,n)\check{B}(m,n)}{\sum_{m=0}^{M-1}\sum_{n=0}^{N-1} \check{B}^2(m,n)}$ | $\sigma_G^2 - \dfrac{\left\{\sum_{m=0}^{M-1}\sum_{n=0}^{N-1} \tilde{G}(m,n)\check{B}(m,n)\right\}^2}{\sigma_B^2}$ |

TABLE 1-continued

Optimal Coefficients: Two-channel case $$\alpha_G^* = \frac{\sum_{m=0}^{M-1}\sum_{n=0}^{N-1} \tilde{G}(m,n)\tilde{B}(m,n)}{\sum_{m=0}^{M-1}\sum_{n=0}^{N-1} \tilde{B}^2(m,n)} \qquad \sigma_B^2 - \frac{\left\{\sum_{m=0}^{M-1}\sum_{n=0}^{N-1} \tilde{B}(m,n)\tilde{R}(m,n)\right\}^2}{\sigma_R^2}$$

$\tilde{R}(m,n) = R(m,n) - \mu_R,$
$\tilde{G}(m,n) = G(m,n) - \mu_G$
$\tilde{B}(m,n) = B(m,n) - \mu_B$

| Case | Optimal Coefficients: 1$^{st}$ set | Remark |
|---|---|---|
| Minimum Correlation | $\alpha_R^* = \dfrac{\sum_{m=0}^{M-1}\sum_{n=0}^{N-1} R^2(m,n) + \sum_{m=0}^{M-1}\sum_{n=0}^{N-1} B(m,n)R(m,n)}{\sum_{m=0}^{M-1}\sum_{n=0}^{N-1} R(m,n)G(m,n) + \sum_{m=0}^{M-1}\sum_{n=0}^{N-1} G(m,n)B(m,n)}$ | |
| | $\alpha_G^* = \dfrac{\sum_{m=0}^{M-1}\sum_{n=0}^{N-1} G^2(m,n) + \sum_{m=0}^{M-1}\sum_{n=0}^{N-1} R(m,n)G(m,n)}{\sum_{m=0}^{M-1}\sum_{n=0}^{N-1} G(m,n)B(m,n) + \sum_{m=0}^{M-1}\sum_{n=0}^{N-1} B(m,n)R(m,n)}$ | |
| | $\alpha_B^* = \dfrac{\sum_{m=0}^{M-1}\sum_{n=0}^{N-1} B^2(m,n) + \sum_{m=0}^{M-1}\sum_{n=0}^{N-1} G(m,n)B(m,n)}{\sum_{m=0}^{M-1}\sum_{n=0}^{N-1} B(m,n)R(m,n) + \sum_{m=0}^{M-1}\sum_{n=0}^{N-1} R(m,n)G(m,n)}$ | |
| Minimum Covariance | $\alpha_R^* = \dfrac{\sum_{m=0}^{M-1}\sum_{n=0}^{N-1} \tilde{R}^2(m,n) + \sum_{m=0}^{M-1}\sum_{n=0}^{N-1} \tilde{B}(m,n)\tilde{R}(m,n)}{\sum_{m=0}^{M-1}\sum_{n=0}^{N-1} \tilde{R}(m,n)\tilde{G}(m,n) + \sum_{m=0}^{M-1}\sum_{n=0}^{N-1} \tilde{G}(m,n)\tilde{B}(m,n)}$ | $\tilde{R}(m,n) = R(m,n) - \mu_R$ |
| | $\alpha_G^* = \dfrac{\sum_{m=0}^{M-1}\sum_{n=0}^{N-1} \tilde{G}^2(m,n) + \sum_{m=0}^{M-1}\sum_{n=0}^{N-1} \tilde{R}(m,n)\tilde{G}(m,n)}{\sum_{m=0}^{M-1}\sum_{n=0}^{N-1} \tilde{G}(m,n)\tilde{B}(m,n) + \sum_{m=0}^{M-1}\sum_{n=0}^{N-1} \tilde{B}(m,n)\tilde{R}(m,n)}$ | $\tilde{G}(m,n) = G(m,n) - \mu_G$ |
| | $\alpha_B^* = \dfrac{\sum_{m=0}^{M-1}\sum_{n=0}^{N-1} \tilde{B}^2(m,n) + \sum_{m=0}^{M-1}\sum_{n=0}^{N-1} \tilde{G}(m,n)\tilde{B}(m,n)}{\sum_{m=0}^{M-1}\sum_{n=0}^{N-1} \tilde{B}(m,n)\tilde{R}(m,n) + \sum_{m=0}^{M-1}\sum_{n=0}^{N-1} \tilde{R}(m,n)\tilde{G}(m,n)}$ | $\tilde{B}(m,n) = B(m,n) - \mu_B$ |

TABLE 2

Optimal Coefficients: Three-channel case

| Case | Optimal Coefficients |
|---|---|
| Minimum MSE | $\begin{bmatrix} \sum_{m=0}^{M-1}\sum_{n=0}^{N-1} G^2(m,n) & \sum_{m=0}^{M-1}\sum_{n=0}^{N-1} G(m,n)B(m,n) \\ \sum_{m=0}^{M-1}\sum_{n=0}^{N-1} G(m,n)B(m,n) & \sum_{m=0}^{M-1}\sum_{n=0}^{N-1} B^2(m,n) \end{bmatrix} \begin{bmatrix} \alpha_R \\ \beta_R \end{bmatrix} = \begin{bmatrix} \sum_{m=0}^{M-1}\sum_{n=0}^{N-1} R(m,n)G(m,n) \\ \sum_{m=0}^{M-1}\sum_{n=0}^{N-1} B(m,n)R(m,n) \end{bmatrix}$ |

TABLE 2-continued

Optimal Coefficients: Three-channel case

| Case | Optimal Coefficients |
|------|----------------------|

$$\begin{bmatrix} \sum_{m=0}^{M-1}\sum_{n=0}^{N-1} B^2(m,n) & \sum_{m=0}^{M-1}\sum_{n=0}^{N-1} B(m,n)R(m,n) \\ \sum_{m=0}^{M-1}\sum_{n=0}^{N-1} B(m,n)R(m,n) & \sum_{m=0}^{M-1}\sum_{n=0}^{N-1} R^2(m,n) \end{bmatrix} \begin{bmatrix} \alpha_G \\ \beta_G \end{bmatrix} = \begin{bmatrix} \sum_{m=0}^{M-1}\sum_{n=0}^{N-1} G(m,n)B(m,n) \\ \sum_{m=0}^{M-1}\sum_{n=0}^{N-1} R(m,n)G(m,n) \end{bmatrix}$$

$$\begin{bmatrix} \sum_{m=0}^{M-1}\sum_{n=0}^{N-1} R^2(m,n) & \sum_{m=0}^{M-1}\sum_{n=0}^{N-1} R(m,n)G(m,n) \\ \sum_{m=0}^{M-1}\sum_{n=0}^{N-1} R(m,n)G(m,n) & \sum_{m=0}^{M-1}\sum_{n=0}^{N-1} G^2(m,n) \end{bmatrix} \begin{bmatrix} \alpha_B \\ \beta_B \end{bmatrix} = \begin{bmatrix} \sum_{m=0}^{M-1}\sum_{n=0}^{N-1} B(m,n)R(m,n) \\ \sum_{m=0}^{M-1}\sum_{n=0}^{N-1} G(m,n)B(m,n) \end{bmatrix}$$

Minimum Variance

$$\begin{bmatrix} \sum_{m=0}^{M-1}\sum_{n=0}^{N-1} \tilde{G}^2(m,n) & \sum_{m=0}^{M-1}\sum_{n=0}^{N-1} \tilde{G}(m,n)\tilde{B}(m,n) \\ \sum_{m=0}^{M-1}\sum_{n=0}^{N-1} \tilde{G}(m,n)\tilde{B}(m,n) & \sum_{m=0}^{M-1}\sum_{n=0}^{N-1} \tilde{B}^2(m,n) \end{bmatrix} \begin{bmatrix} \alpha_R \\ \beta_R \end{bmatrix} = \begin{bmatrix} \sum_{m=0}^{M-1}\sum_{n=0}^{N-1} \tilde{R}(m,n)\tilde{G}(m,n) \\ \sum_{m=0}^{M-1}\sum_{n=0}^{N-1} \tilde{B}(m,n)\tilde{R}(m,n) \end{bmatrix}$$

$$\begin{bmatrix} \sum_{m=0}^{M-1}\sum_{n=0}^{N-1} \tilde{B}^2(m,n) & \sum_{m=0}^{M-1}\sum_{n=0}^{N-1} \tilde{B}(m,n)\tilde{R}(m,n) \\ \sum_{m=0}^{M-1}\sum_{n=0}^{N-1} \tilde{B}(m,n)\tilde{R}(m,n) & \sum_{m=0}^{M-1}\sum_{n=0}^{N-1} \tilde{R}^2(m,n) \end{bmatrix} \begin{bmatrix} \alpha_G \\ \beta_G \end{bmatrix} = \begin{bmatrix} \sum_{m=0}^{M-1}\sum_{n=0}^{N-1} \tilde{G}(m,n)\tilde{B}(m,n) \\ \sum_{m=0}^{M-1}\sum_{n=0}^{N-1} \tilde{R}(m,n)\tilde{G}(m,n) \end{bmatrix}$$

$$\begin{bmatrix} \sum_{m=0}^{M-1}\sum_{n=0}^{N-1} \tilde{R}^2(m,n) & \sum_{m=0}^{M-1}\sum_{n=0}^{N-1} \tilde{R}(m,n)\tilde{G}(m,n) \\ \sum_{m=0}^{M-1}\sum_{n=0}^{N-1} \tilde{R}(m,n)\tilde{G}(m,n) & \sum_{m=0}^{M-1}\sum_{n=0}^{N-1} \tilde{G}^2(m,n) \end{bmatrix} \begin{bmatrix} \alpha_R \\ \beta_R \end{bmatrix} = \begin{bmatrix} \sum_{m=0}^{M-1}\sum_{n=0}^{N-1} \tilde{B}(m,n)\tilde{R}(m,n) \\ \sum_{m=0}^{M-1}\sum_{n=0}^{N-1} \tilde{G}(m,n)\tilde{B}(m,n) \end{bmatrix}$$

$\tilde{R}(m,n) = R(m,n) - \mu_R$, $\tilde{G}(m,n) = G(m,n) - \mu_G$, $\tilde{B}(m,n) = B(m,n) - \mu_B$

Minimum Correlation

$$\begin{bmatrix} \sum_{m=0}^{M-1}\sum_{n=0}^{N-1} RG & \sum_{m=0}^{M-1}\sum_{n=0}^{N-1} BR \\ \sum_{m=0}^{M-1}\sum_{n=0}^{N-1} [G^2 - GB] & \sum_{m=0}^{M-1}\sum_{n=0}^{N-1} [GB - B^2] \end{bmatrix} \begin{bmatrix} \alpha_B \\ \beta_B \end{bmatrix} = \begin{bmatrix} \sum_{m=0}^{M-1}\sum_{n=0}^{N-1} R^2 \\ \sum_{m=0}^{M-1}\sum_{n=0}^{N-1} [RG - BR] \end{bmatrix}$$

$$\begin{bmatrix} \sum_{m=0}^{M-1}\sum_{n=0}^{N-1} GB & \sum_{m=0}^{M-1}\sum_{n=0}^{N-1} RG \\ \sum_{m=0}^{M-1}\sum_{n=0}^{N-1} [B^2 - BR] & \sum_{m=0}^{M-1}\sum_{n=0}^{N-1} [BR - R^2] \end{bmatrix} \begin{bmatrix} \alpha_G \\ \beta_G \end{bmatrix} = \begin{bmatrix} \sum_{m=0}^{M-1}\sum_{n=0}^{N-1} G^2 \\ \sum_{m=0}^{M-1}\sum_{n=0}^{N-1} [GB - RG] \end{bmatrix}$$

$$\begin{bmatrix} \sum_{m=0}^{M-1}\sum_{n=0}^{N-1} BR & \sum_{m=0}^{M-1}\sum_{n=0}^{N-1} GB \\ \sum_{m=0}^{M-1}\sum_{n=0}^{N-1} [R^2 - RG] & \sum_{m=0}^{M-1}\sum_{n=0}^{N-1} [RG - G^2] \end{bmatrix} \begin{bmatrix} \alpha_B \\ \beta_B \end{bmatrix} = \begin{bmatrix} \sum_{m=0}^{M-1}\sum_{n=0}^{N-1} B^2 \\ \sum_{m=0}^{M-1}\sum_{n=0}^{N-1} [BR - GB] \end{bmatrix}$$

Minimum Covariance

$$\begin{bmatrix} \sum_{m=0}^{M-1}\sum_{n=0}^{N-1} \tilde{R}\tilde{G} & \sum_{m=0}^{M-1}\sum_{n=0}^{N-1} \tilde{B}\tilde{R} \\ \sum_{m=0}^{M-1}\sum_{n=0}^{N-1} [\tilde{G}^2 - \tilde{G}\tilde{B}] & \sum_{m=0}^{M-1}\sum_{n=0}^{N-1} [\tilde{G}\tilde{B} - \tilde{B}^2] \end{bmatrix} \begin{bmatrix} \alpha_R \\ \beta_R \end{bmatrix} = \begin{bmatrix} \sum_{m=0}^{M-1}\sum_{n=0}^{N-1} \tilde{R}^2 \\ \sum_{m=0}^{M-1}\sum_{n=0}^{N-1} [\tilde{R}\tilde{G} - \tilde{B}\tilde{R}] \end{bmatrix}$$

TABLE 2-continued

Optimal Coefficients: Three-channel case

| Case | Optimal Coefficients |
|---|---|

$$\begin{bmatrix} \sum_{m=0}^{M-1}\sum_{n=0}^{N-1} \tilde{G}\tilde{B} & \sum_{m=0}^{M-1}\sum_{n=0}^{N-1} \tilde{R}\tilde{G} \\ \sum_{m=0}^{M-1}\sum_{n=0}^{N-1} [\tilde{B}^2 - \tilde{B}\tilde{R}] & \sum_{m=0}^{M-1}\sum_{n=0}^{N-1} [\tilde{B}\tilde{R} - \tilde{R}^2] \end{bmatrix} \begin{bmatrix} \alpha_G \\ \beta_G \end{bmatrix} = \begin{bmatrix} \sum_{m=0}^{M-1}\sum_{n=0}^{N-1} \tilde{G}^2 \\ \sum_{m=0}^{M-1}\sum_{n=0}^{N-1} [\tilde{G}\tilde{B} - \tilde{R}\tilde{G}] \end{bmatrix}$$

$$\begin{bmatrix} \sum_{m=0}^{M-1}\sum_{n=0}^{N-1} \tilde{B}\tilde{R} & \sum_{m=0}^{M-1}\sum_{n=0}^{N-1} \tilde{G}\tilde{B} \\ \sum_{m=0}^{M-1}\sum_{n=0}^{N-1} [\tilde{R}^2 - \tilde{R}\tilde{G}] & \sum_{m=0}^{M-1}\sum_{n=0}^{N-1} [\tilde{R}\tilde{G} - \tilde{G}^2] \end{bmatrix} \begin{bmatrix} \alpha_B \\ \beta_B \end{bmatrix} = \begin{bmatrix} \sum_{m=0}^{M-1}\sum_{n=0}^{N-1} \tilde{B}^2 \\ \sum_{m=0}^{M-1}\sum_{n=0}^{N-1} [\tilde{B}\tilde{R} - \tilde{G}\tilde{B}] \end{bmatrix}$$

$\tilde{R}(m, n) = R(m, n) - \mu_R$, $\tilde{G}(m, n) = G(m, n) - \mu_G$, $\tilde{B}(m, n) = B(m, n) - \mu_B$ In suboptimal processing there is no cost function involved, the coefficient value is chosen on an ad hoc basis and the resulting mean square error or error variance is not necessarily the minimum. Further, only two components are used in the differencing process.

The difference images are obtained by selecting the weights as the ratio of the mean values of the respective image components involved, as given by:

$$e_R(m, n) = R(m, n) - \alpha_R G(m, n); \quad \text{Equation 42}$$
$$\alpha_R = \frac{\mu_R}{\mu_G}$$

$$e_G(m, n) = G(m, n) - \alpha_G B(m, n); \quad \text{Equation 43}$$
$$\alpha_G = \frac{\mu_G}{\mu_B}$$

$$e_B(m, n) = B(m, n) - \alpha_B R(m, n); \quad \text{Equation 44}$$
$$\alpha_B = \frac{\mu_B}{\mu_R}$$

In the second case, the coefficients are chosen as the ratio of the standard deviations of the component images and the weights are given by:

$$\alpha_R = \frac{\sigma_R}{\sigma_G}; \alpha_G = \frac{\sigma_G}{\sigma_B}; \alpha_B = \frac{\sigma_B}{\sigma_R} \quad \text{Equation 45}$$

For a third case we choose the ratio of the maximum component values as the coefficient values. Thus, $$\alpha_R = \frac{\max(R(m, n))}{\max(G(m, n))}; \alpha_G = \frac{\max(G(m, n))}{\max(B(m, n))}; \quad \text{Equation 46}$$
$$\alpha_B = \frac{\max(B(m, n))}{\max(R(m, n))}$$

The image may be processed in whole or in sub-blocks. The pre-detection processing methods just described can be applied to the whole image or they can be applied to sub-blocks of an image. Images in general and video sequence images in particular are non-stationary. This implies that the statistics change over regions within an image. To exploit non-stationarity of images, it is advantageous to apply the pre-detection processing methods to subimages. As shown in FIG. 1, one can process sub-blocks of fixed size or variable size or one row at a time. In processing sub-blocks of varying size, one has to adopt a suitable criterion for choosing sub-block size. This is described in the next subsection.

Quad-tree decomposition is an efficient procedure to decompose an image into sub-blocks. The only requirement is that the image height and width be integer powers of 2. In this procedure one starts with a given image as the root node of a tree and a suitable metric for the whole image is calculated. Next the metrics for the four sub-blocks, each of size $\frac{1}{4}^{th}$ the size of the whole image are computed. A decision is made to split each sub-block sequentially depending on whether that sub-block metric is greater than the metric of its parent node. This process is continued until the specified sub-block size is reached. The minimum number of sub-blocks is 4. FIG. 2 shows a typical quad-tree structure.

The contrast of the processed component images can be improved by contrast stretching. The contrast regions are automatically selected using the image statistics such as the image histogram.

Once the images are processed we need to draw the boundaries of the targets present in the scene for further data collection such as target classification. This involves first smoothing of the processed images. Smoothing generally tends to blur the image. Hence we use special, non-blurring filtering such as the diffusion filtering to smooth the processed images. Next an edge detection processing method, typically Canny's method, is used followed by morphological processing to calculate properties of the object boundaries.

The acquired raw images usually contain a number of pixels that are saturated. These may occur as isolated single pixels or as clusters of pixels scattered over the image. These clusters of saturated pixels are known as glints. The presence of glints reduces the contrast of areas of interest, especially if the glints occupy a sizeable fraction of the image area. Moreover, glints dominate the statistical quantities of interest due to their very large values. Therefore, images must be preprocessed to remove the presence of glints. Preprocessing is also necessary to reduce image noise.

Preprocessing images in the wavelet domain is effective in removing glints and noise from the images. It also has the advantage of computational savings. Specifically, applications of two-dimensional Discrete Wavelet Transform (DWT) once to the image decomposes it into one approximation and three detail coefficients, each $\frac{1}{4}^{th}$ the size of the original image. It has been found that biorthogonal wavelet performs better than orthogonal wavelet. The approximation coefficients contain the information in the original image at a lower resolution. Hence glint removal operation is performed on the approximation coefficients. As pointed out, since the approximation component of the DWT coefficients is only $\frac{1}{4}^{th}$ the size of the original image, computational saving is achieved. As the detail coefficients carry edge information in the original image at lower resolutions, image denoising (a term used to imply the removal of noise) is effected in these components. Once glint removal and denoising operations are performed, the image is reconstructed by applying inverse 2D DWT (IDWT) to the DWT coefficients.

The detail components of the 2D DWT of each channel image contain edge information as well as noise. Noise coefficients have amplitudes according to a Laplacian distribution and are usually large while edges have smaller amplitudes. Thus noise is reduced by thresholding the detail coefficients in the wavelet domain. These thresholds are determined based on the statistics of the detail coefficients.

Glints are specular reflections of the IR source by the surface being imaged. Therefore, glints produce highly saturated pixels in all the channels whose size depend on various properties of the reflecting surface and it is random. Consequently, the approximation coefficients of the 2D DWT must be inspected. In one approach, glints may be removed or reduced using morphological processing to determine the boundaries of the glint regions, which in turn are determined by hard or soft thresholding. The thresholds are determined from the statistics of the approximation coefficients of the 2D DWT. Thresholding can be performed on each channel or on the dominant channel. Thresholding yields a binary image from which the boundaries of the glints are calculated. Glint regions are eliminated by replacing them with corresponding mean values in all the channels.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for detecting, identifying or classifying of objects hidden on the surface or buried below the surface of the ground, comprising:
    acquiring image data in separate infrared (IR) and/or visible spectral regions simultaneously;
    converting the acquired image data into intensity value arrays for each spectral region;
    applying a transformation on the intensity value arrays to form two-dimensional discrete wavelet transform arrays for each spectral region;
    removing background clutter from the two-dimensional discrete wavelet transform arrays to form clutter reduced two-dimensional discrete wavelet transform arrays;
    performing an inverse two-dimensional discrete wavelet transform on the clutter reduced two-dimensional discrete wavelet transform arrays to form clutter removed intensity value arrays;
    subtracting the clutter removed intensity value arrays in a pair-wise manner to obtain chemical-specific thermal spectral signatures; and
    correlating the chemical-specific thermal spectral signatures with 3-dimensional matched filters of known emissive signatures of objects to detect a presence of the object.

2. The method of claim 1, further comprising:
    applying at least one of a 3-dimensional, a 4-dimensional or a 3- and 4-dimensional feature vector space to compare a thermal spectral signature of an inspected soil with a thermal spectral signature of surrounding soil, to determine a disturbed soil condition.

* * * * *